Aug. 16, 1932.  L. F. MEUNIER  1,871,803
PACKING FOR FLUID PRESSURE MOTORS
Filed Aug. 5, 1926  2 Sheets-Sheet 1
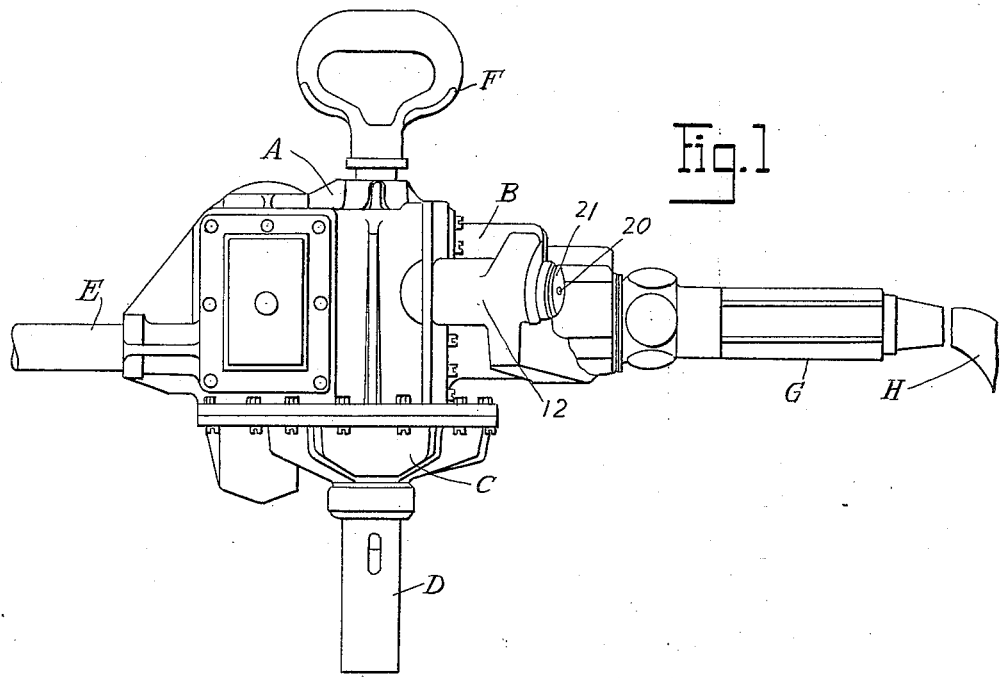
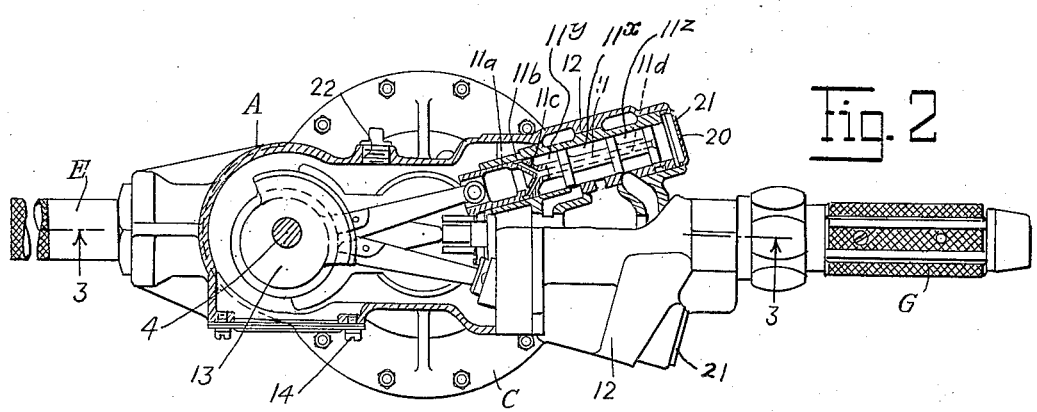
INVENTOR.
Leon F. Meunier
BY
Ira L. Nickerson
ATTORNEY.

Aug. 16, 1932.    L. F. MEUNIER    1,871,803
PACKING FOR FLUID PRESSURE MOTORS
Filed Aug. 5, 1926    2 Sheets-Sheet 2

INVENTOR.
Leon F. Meunier
BY
Ira L. Nickerson
ATTORNEY.

Patented Aug. 16, 1932

1,871,803

UNITED STATES PATENT OFFICE

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY

PACKING FOR FLUID PRESSURE MOTORS

Application filed August 5, 1926. Serial No. 127,216.

This invention relates to fluid pressure motors and more particularly to the matter of the crank case lubrication of such motors. While the invention presents aspects of general application and utility, it has been developed with particular reference to tools of the portable type operated by compressed air, especially those having a rotating spindle driven by a crank shaft actuated by reciprocating pistons.

Crank case lubricating and cylinder housing venting have always presented a perplexing problem in pneumatic drill construction. There is always leakage of motive fluid past the valve and pistons of the motor into the crank case requiring venting of the latter and the violent agitation of the lubricant in the crank case results in much lubricant being carried away by the vented pressure fluid. Much has been done in the way of improved venting devices to effect retention of the lubricant but the best of vents will allow the grease to be blown out when there is an excess over a given quantity of lubricant in the crank case and in certain positions of the tool the loss of lubricant is greatly increased. In any event it is common practice to inspect and refill the crank case with lubricant frequently, often at least once a day if the parts are somewhat worn, and the penalty for oversight or neglect is badly worn or broken parts and heavy expense for repairs.

Among the objects of the invention are to reduce the cost of upkeep and the repair expense incident to the operation of motors of the type described, to prevent the loss of lubricant from the crank case of such motors, to increase the durability and the reliability of such motors, and in general to simplify and to improve prior devices in attaining the above objects in the interests of more efficient and satisfactory service.

The invention consists essentially in preventing leakage of motive fluid into the crank case so that the latter can be sealed up and operated without a vent. There is then no loss of lubricant and the motor can be operated for weeks or months with perfect safety and without danger of being run while in a "dry" or unlubricated condition.

In order to illustrate the invention one concrete embodiment thereof is shown in the accompanying drawings, in which:

Fig. 1 is a side elevational view of a portable fluid pressure tool embodying the invention;

Fig. 2 is a top plan view of the tool shown in Fig. 1 partly in section in the plane of the automatic control valves for the fluid pressure motor;

Figure 3:
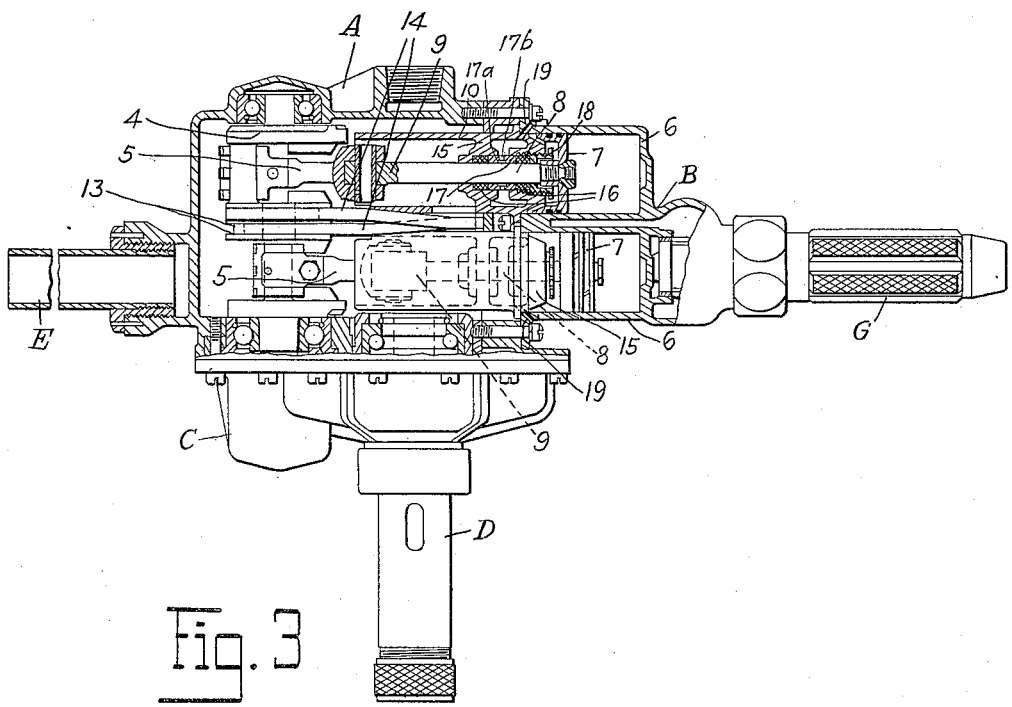
Fig. 3 is a partial vertical sectional view substantially on the line 3—3 of Fig. 2.

The embodiment of the invention chosen for the purpose of illustration is a portable pneumatic drill comprising a main or crank shaft housing A, a motor cylinder housing B and a transmission housing C from which projects the tool holding spindle D. The motor housing B and the transmission housing C are bolted to the main housing A as indicated and the tool is arranged to be manually supported and controlled by handles E, F and G, the latter being the throttle handle for controlling the motive fluid entering through supply conduit H.

Within the main housing A is rotatably mounted in suitable bearings the crank shaft 4 which is driven through connecting rods 5 by the motor which in the present instance is of the two cylinder double acting type. The cylinders 6 formed in or a part of the motor casing B are in superposed parallelism and provide chambers for the reciprocating pistons 7 having rods 8 extending through the inner end walls of the piston chamber. Rods 8 are attached to cross heads 9 slidably received in guides 10 in line with cylinders 6 and projecting within crank casing A. Connecting rods 5 are attached to crossheads 9 for pivotal movement as indicated. The control and distribution of motive fluid admitted through throttle handle G to the motor is effected by slide valves 11 (Fig. 2) mounted for reciprocatory movement in valve casings 12 formed in or as a part of motor housing B, the valves being driven from eccentrics 13 on the crank shaft 4 by connecting rods 14 having collars encircling eccentric cams 13. Each valve provides a central exhaust chamber 11x and pressure fluid chambers 11y and 11z on either side of the central exhaust chamber. The tool as so far described does not differ in structure or in functional operation from known types of tools such for example as that disclosed in the copending application of Anthony H. Collins, Serial No. 687,685, filed January 22, 1924, and further description of the general features thereof is accordingly omitted.

Consideration will now be given to the manner and means by which leakage of motive fluid from valve chambers 12 and piston chambers 10 to the crank chamber within casing A is prevented so that the tool may be operated as a ventless drill. Referring first to the piston arrangement as disclosed in Fig. 3, the inner ends of the piston chambers provided by cylinder 6 are closed by end walls comprising spaced perforated partitions 15 forming integral portions of guides 10 and through which extend piston rods 8. A counterbore in partitions 15 surrounding rods 8 contains packings 16 separated by a spacing sleeve 17, both packings being arranged to be tightened by a single screw packing gland 18. Spacing sleeve 17 has an internal groove 17a adjacent the piston rod 8 and radial ports 17b opening into the space between partitions 15, whence leads a vent passage 19 to atmosphere so that any leakage of motive fluid from the piston chamber is intercepted and vented to atmosphere and is thus prevented from reaching the crank case, while leakage of lubricant from the crank case to the vented space between the partitions 15 is prevented by the inner packing 16.

A somewhat different arrangement is provided for protecting the crank case against leakage of motive fluid from the valve chambers. Referring to Fig. 2, it will be noted that the inner end of each slide valve 11 is formed with an elongate head 11a which is provided with a leakage intercepting groove 11b from which extends a plurality of angularly inclined passages 11c communicating with an axial vent passage 11d to the outer end of the valve where free access to atmosphere is had through an opening 20 in cap 21 which closes the outer end of valve case 12.

With the above described arrangement the crank case may be filled to the desired extent with lubricant through opening 22 therefor (Fig. 2) and then the crank case may be safely sealed in an air tight manner. Even with excessive wear on the piston rods and valves, it is not possible for a dangerous volume of air under pressure to accumulate in the crank case since the venting arrangements above described are entirely adequate to take care of such leakage. With this system of leakage venting, it is possible with one filling of grease to properly lubricate a drill of the disclosed type for long periods, since there is no high pressure to force the grease out of the crank case and since very little grease is actually consumed by the friction of the parts. In its freedom from constant attention this system is quite comparable to the splash lubrication of a stationary engine but has the superior advantage of avoiding the losses of lubricant experienced in the ordinary splash system due to the passage of air into and out of the crank case through the atmospheric vent in response to the variations in pressure incident to the operation of the engine.

While a preferred form of the invention has been herein shown and described it is to be understood that the invention is not limited to the specific details thereof but covers all changes, modifications and adaptations within the scope of the appended claim.

I claim as my invention:

In a packing and venting arrangement for machines having reciprocating double acting pistons, a piston chamber having at one end two axially spaced and relatively immovable rod supporting partitions one of said partitions serving as a closure for the piston chamber, a piston rod projecting through said partitions, said partitions being counterbored adjacent said rod, packings on said rod within said counterbores, a perforated spacing sleeve surrounding said rod between said packings and engaging with the walls of the counterbores of said partitions, said sleeve having an internal annular groove and radial ports from said groove to the space between said partitions, a vent to atmosphere from said space, and a single gland member engaging one of said packings and operable through said sleeve upon the other packing for setting up both packings at once.

Signed at Cleveland this 31 day of July, 1926.

LEON F. MEUNIER.